United States Patent
Hansen et al.

(10) Patent No.: US 7,989,710 B2
(45) Date of Patent: Aug. 2, 2011

(54) COVERED IN-FLOOR RECEPTACLE BOX

(75) Inventors: David Hansen, Garnerville, NY (US); John Macaluso, Clifton, NJ (US)

(73) Assignee: FSR Inc., West Paterson, NJ (US)

( * ) Notice: Subject to any disclaimer, the term of this patent is extended or adjusted under 35 U.S.C. 154(b) by 434 days.

(21) Appl. No.: 12/199,950

(22) Filed: Aug. 28, 2008

(65) Prior Publication Data
US 2010/0051308 A1    Mar. 4, 2010

(51) Int. Cl.
*H02G 3/18* (2006.01)
*H02G 3/08* (2006.01)

(52) U.S. Cl. ............ 174/482; 174/490; 174/53; 174/50; 220/3.2; 220/3.3

(58) Field of Classification Search .............. 174/50.5, 174/50, 520, 59, 480, 490, 502, 489, 488, 174/53, 57, 58, 484, 482, 481; 220/3.2–3.9, 220/4.02; 248/906; 211/10, 184; 52/220.1, 52/220.3, 220.5, 220.7
See application file for complete search history.

(56) References Cited

U.S. PATENT DOCUMENTS

| | | | |
|---|---|---|---|
| 3,905,484 A * | 9/1975 | Dean et al. ................. 211/184 |
| 4,433,204 A * | 2/1984 | Wuertz ....................... 174/53 |
| 4,536,612 A * | 8/1985 | Domigan .................... 174/489 |
| 4,899,506 A * | 2/1990 | Chapman et al. ........... 174/488 |
| 5,122,069 A * | 6/1992 | Brownlie et al. ........... 174/53 |
| 5,350,884 A | 9/1994 | Litrell |
| 5,468,908 A | 11/1995 | Arthur et al. |
| 5,486,650 A * | 1/1996 | Yetter ........................ 174/53 |
| 5,796,037 A | 8/1998 | Young et al. |
| 6,274,809 B1 | 8/2001 | Pudims et al. |
| 6,395,978 B1 | 5/2002 | Whitehead et al. |
| 6,566,600 B1 * | 5/2003 | Ford et al. ................. 174/50 |
| 6,635,821 B2 * | 10/2003 | Loeffelholz et al. ....... 174/53 |
| 6,653,561 B2 * | 11/2003 | Lalancette et al. ......... 174/50 |
| 7,045,706 B1 * | 5/2006 | Lincoln et al. ............. 174/50 |

* cited by examiner

*Primary Examiner* — Angel R Estrada
(74) *Attorney, Agent, or Firm* — Florek & Endres PLLC

(57) ABSTRACT

An in-floor receptacle or electrical conduit box with a compartment divider removably attached to a gang-plate divider, a gang-plate divider removably attached to a gang-unit holder, at least one gang-unit holder removably attached to the inside of the box, and at least one knockout located on each side or floor of the box. The in-floor electrical conduit box enables the connection of permanent cables, wires or cords to temporary cables, wires or cords.

The in-floor electrical conduit box further comprises a lid with at least one removable door whereby the removal of the door permits cable access to the box while the box is still covered.

24 Claims, 10 Drawing Sheets

Figure 3C
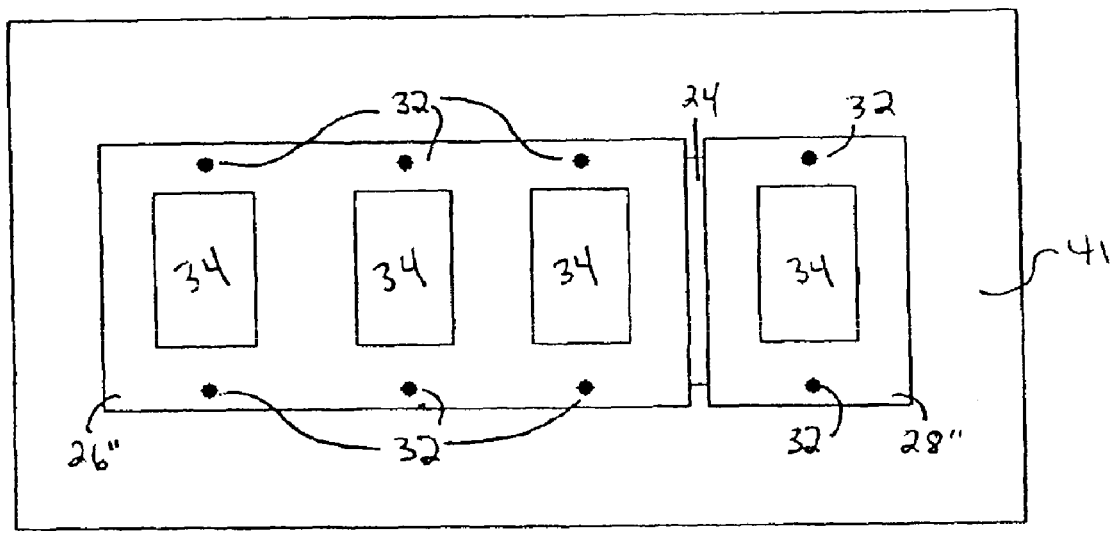
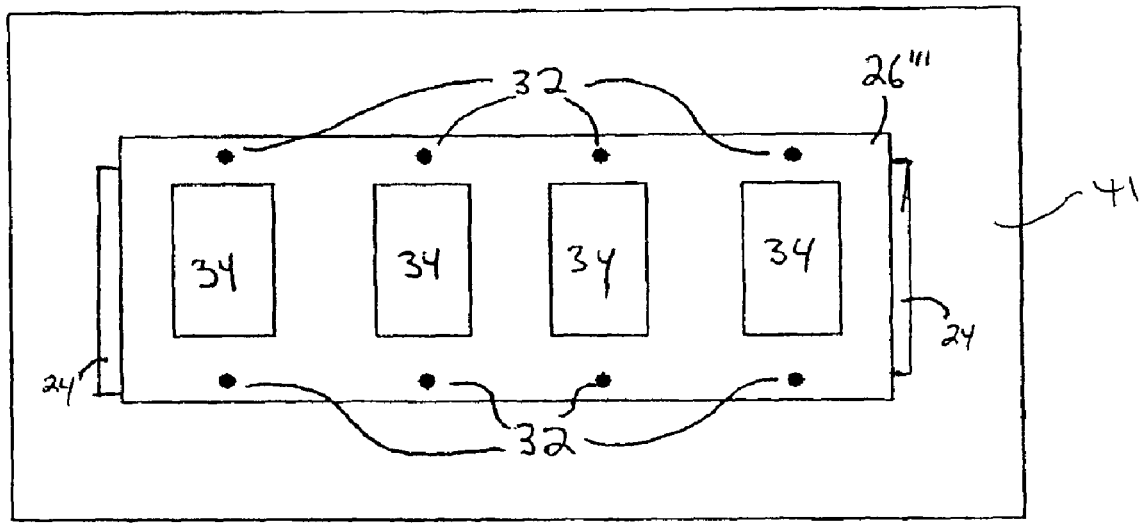
Figure 3D

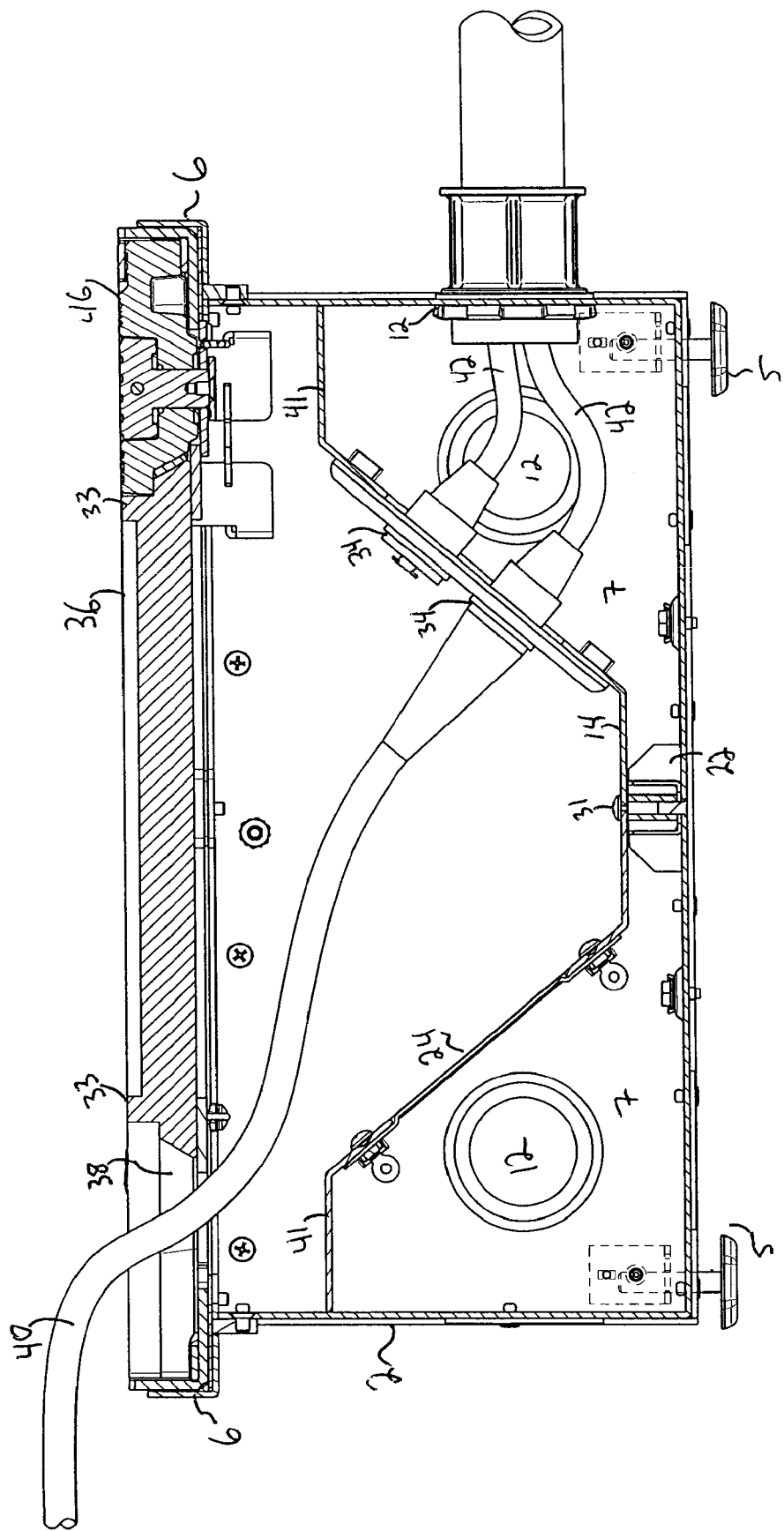

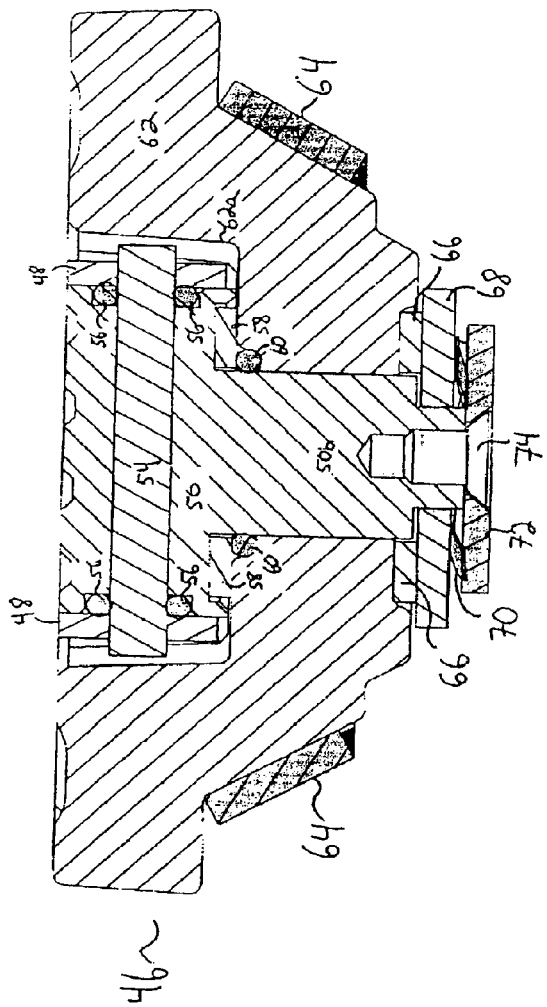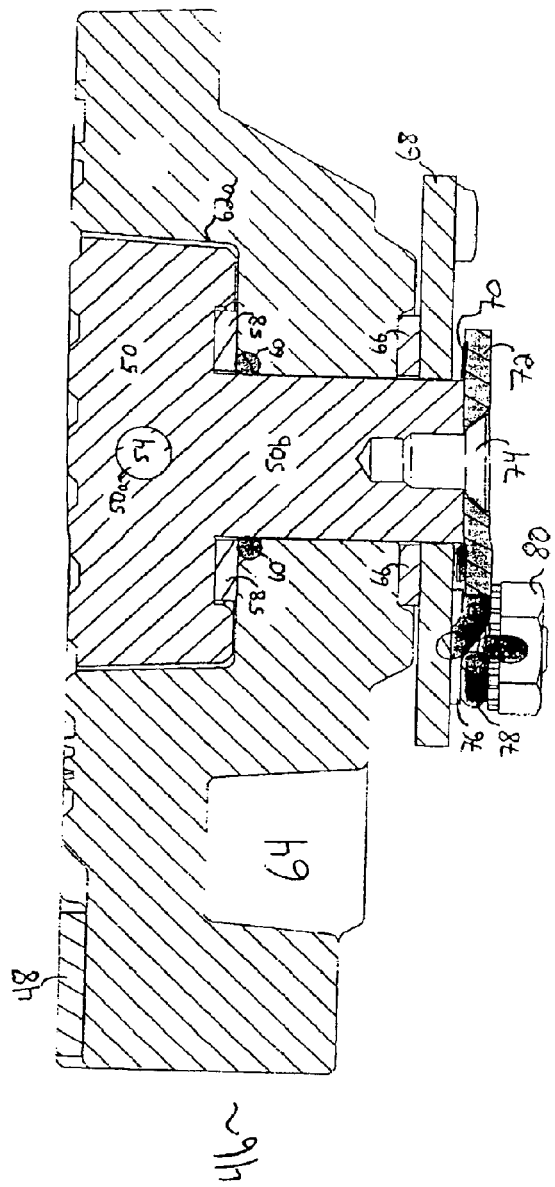

COVERED IN-FLOOR RECEPTACLE BOX

FIELD OF THE INVENTION

The present invention relates to an in-floor receptacle box. More particularly, the present invention relates to an in-floor receptacle box that is adaptable to different user-configurable gang-unit arrangements. Even more particularly, the present invention relates to an in-floor receptacle box that can be used while being covered by a weight-bearing lid.

BACKGROUND OF THE INVENTION

Many venues, such as educational and entertainment halls, use advanced audio and video ("AV") equipment during routine functions and business. For example, a banquet hall may have a complete sound system to which it allows visiting musical bands or DJs to connect microphones, stereo systems or other equipment. A college lecture hall may have a full video system, to which it allows professors to connect laptop computers, DVD players or other equipment. Likewise, a community center or exhibition hall may have a full video or sound system, to which traveling shows may connect microphones or other electrical and/or electronic equipment.

When a visitor to a venue desires to use his own AV equipment, many cables and wires may be required. As used in this document, the terms "cables", "wires" and "cords" are interchangeable; "permanent" refers to cables, wires or cords that have previously been installed into the floor by the venue, whether or not removable and replaceable, and "temporary" refers to cables, wires or cords that are stored at the facility or brought by visitors (e.g., by a visiting band, DJ, etc.). For example, a professor using a laptop computer in a lecture hall may be required to use a power cord, a high-speed internet cable, and an HDMI cable. A band in a banquet hall may require the use of multiple power cords and multiple audio cables. In the prior art, these and other various cords are sometimes laid across the floor in order to be connected to their appropriate power/signal receptacles located on a nearby wall, possibly with duct or electrical tape utilized to keep the cords from moving across the floor. However, these cords represent a danger to anyone traversing the floor. While students sitting in a lecture hall might not be at risk of tripping over these cords and cables, the same cannot be said of wedding attendees who are dancing across a dance floor.

More commonly used in the prior art are floor boxes that are placed into the floor in order to centralize the location of where connections of cords and cables attach to receptacles; however, all the prior art lacks important features that are part of the present invention.

For example, U.S. Pat. No. 5,350,884 to Littrell teaches an exhibition hall electrical floor box which includes a housing having a plurality of chambers, each chamber accommodating a particular type of electrical connection. However, Littrell does not disclose that the chambers can be rearranged, or that the chambers can accommodate various types of connections.

U.S. Pat. No. 5,468,908 to Arthur et al. describes a floor box for use with in-floor service distribution systems. However, Arthur et al. does not teach that different types of cables and wires can easily be accommodated.

U.S. Pat. No. 6,274,809 to Pudims et al. discloses an electrical floor box having more than four outlets around a central access area. However, Pudims et al. does not describe an electrical floor box that can, by design, be easily internally rearranged to accommodate different types of temporary or permanent cables or wires.

U.S. Pat. No. 5,796,037 to Young et al. teaches an electrical floor box that provides connections to one or more in-floor service distribution systems and which includes lower and upper portions. However, Young et al. does not disclose an electrical floor box that can, by design, be easily internally rearranged to accommodate different types of temporary or permanent cables or wires.

U.S. Pat. No. 6,395,978 to Whitehead et al. describes an in-floor electrical outlet box which selectively supports power, data and communication wires. However, Whitehead et al. does not teach an electrical floor box that can, by design, be easily internally rearranged to accommodate different types of temporary or permanent cables or wires.

SUMMARY OF THE INVENTION

It is therefore an object of the present invention to provide an in-floor receptacle or electrical conduit box that can accommodate different temporary and permanent cable, wire and cord components and configurations.

It is another object of the present invention to provide an in-floor receptacle or electrical conduit box that can, by design, be easily internally rearranged—either before or after installation—to accommodate different temporary and permanent cable, wire and cord components and configurations.

It is a further object of the present invention to provide an in-floor receptacle or electrical conduit box that can accept temporary cables, wires and cords while still being substantially flush with the floor.

It is an even further object of the present invention that these temporary cables, wires and cords, when plugged into connectors installed on opposing internal sides of the box, not interfere with each other as they pass on their way outside the box, because of the designed-in offset of the opposing gang-unit areas with respect to each other, that are fabricated into the included removably-fixed gang-unit holders.

It is also an object of the present invention to utilize commonly-available 'gang plates', i.e., standard-sized electrical-switch/outlet-box-covering wallplates normally used in residential, commercial, industrial and office interior spaces, on the internal gang-unit holders. These gang plates, when used in conjunction with the invention's one or more supplied gang plate dividers and gang-unit-hole covering spacers, are an easy and economical means by which the gang-unit holder's compartment spaces (that can contain harmful high-voltage/current permanent wiring) can be completely enclosed, helping to prevent electrically-induced injuries to users of the invention.

It is an even further object of the present invention to provide an in-floor receptacle or electrical conduit box that can blend in with the surrounding décor even while in use.

It is additionally an object of the present invention to provide an in-floor receptacle or electrical conduit box that can be used while in a covered configuration.

It is yet another object of the present invention to meet these objectives in an efficient and economical manner, while at the same time conforming to all of the rules and regulations required in order for the invention to be tested, approved, and listed by Underwriters Laboratories®, Inc. (UL) as safe to install and use in the intended applications.

Accordingly, these objects and others not particularly set forth above are achieved by a user-configurable in-floor receptacle box comprising gang-unit holders removably fixed within the box, with at least one gang plate divider removably attached to each gang-unit holder. Optionally, a gang compartment divider is attached to an appropriately-positioned gang plate divider, in order to electrically isolate one compartment area from another. The user-configurable in-floor electrical conduit box enables the connection of substantially permanent cables, wires or cords, via appropriate user-accessible connectors, to temporary cables, wires or cords through at least one of the receptacle areas located in the gang-unit holders.

In the preferred embodiment of the in-floor electrical conduit box of the present invention, either or both sides of the box are capable of being customer-configurable to numerous different gang-unit space ("G") layouts (i.e., 1GX2G, 2GX1G, 2GX2G, 1GX3G, 3GX1G and 4G—a gang-unit space being defined herein as approximately 1.812 inches in width, which is known to those of skill in the art) in the smallest practical amount of space, which is less than 5 Gs. In fact, it is a preferred 4¾ G space that allows, by a gang-unit mounting-hole spacing differential of one-third of a gang-space, and by gang-hole-covering spacers of 2.00 inches width, each of the box's gang-unit holders to be configured into the six different spaces noted above, with the maximum number of continuous spaces being 4 Gs. This key one-third-space dimension is 0.604 inches, which allows the various components of the present invention that utilize the multi-configurable layout to fit together in a manner that maintains consistent gang-unit spacing, regardless of the chosen gang-space quantity.

It should be noted that, because the use of commonly-available "gang plates" is so practical and economical, their preferred and inevitable use in the present invention creates certain dimensional attributes within the conduit box. Although a 4⅔ G space is the minimum overall space required in order to utilize the invention's unique versatility, it is preferred that a minimum 4¾ G space (noted above) be the minimum practical space that both uses the economical commonly-available gang plates and ensures complete closure of the gang-unit holder's receptacle opening.

Larger sizes of the present invention, encompassing more gang spaces (5¾ G+), are capable of having the same internal-rearrangement versatility as the present invention by using the same key design principles, given an in-floor electrical conduit box that is enlarged appropriately to fit the necessary components and the addition of a gang-hole-covering spacer sized at 3.812 inches wide. For example, a 5 G layout could be accomplished as, and be accommodating of, gang-unit arrangements of 1GX1G, 1GX2G, 1GX3G, 1GX4G, 2GX1G, 2GX2G, 2GX3G, 3GX1G, 3GX2G, 4GX1G, or 5 G; a 6 G layout could be accomplished by a 6¾ G space accommodating gang-unit arrangements of 1GX1G, 1GX2G, 1GX3G, 1GX4G, 1GX5G, 2GX1G, 2GX2G, 2GX3G, 2GX4G, 3GX1G, 3GX2G, 3GX3G, 4GX1G, 4GX2G, 5GX1G, and 6 G; etc. It should be reiterated that a 4 G layout (i.e., a layout capable of supporting a gang unit group of up to 4 Gs) requires a space of 4⅔ G; a 5 G layout requires a space of 5⅔ G; a 6 G layout requires a space of 6⅔ G, etc., although 4¾ G, 5¾ G and 6¾ G spaces are preferred.

Any gang-unit configuration chosen is capable of either sharing the entire space of one side of the box (known as a "compartment") with other gang units on that side of the box, or of being electrically isolated from other gang-unit configurations on that side the box through use of compartment dividers. Additionally, each of the two identical sides of the box may be completely electrically isolated from the other side through the use of a specific plurality of center dividers. If only some center dividers are installed and others are removed, permanent wiring inside the box may pass through to the other side, with full approval-agency spacing-compliance being maintained.

With respect to the enclosing lid of the present invention, it is preferred that the top portion be covered with the flooring material used in the surrounding floor area, so as to blend in with the floor, thus maintaining room décor appearance. Possible flooring-material coverings include tile, carpeting or hardwood that match the floor into which the box will be placed. In another embodiment, the top portion of the lid is not covered, in which case the lid's top surface may optionally be suitably textured so as to provide as non-slip a surface as practically and reasonably possible, for people that will be walking over and across the lid. This embodiment may find use in concrete floors, such as those used in convention centers, warehouses, etc.

In a preferred embodiment, the lid is removably attached to the in-floor electrical conduit box rather than just placed on top of the box; however, a single person should be able to remove and replace the lid. A preferred method of removably attaching the lid to the in-floor electrical conduit box is through the use of "cable-access doors". These cable-access doors, which allow the lid to remain in place while user-installed temporary cables are connected to the box's internal receptacles, preferably have a "tear-drop" shape built into their underside surface that is used to mount the foam rubber required to ensure the lid assembly's "water-tightness" (one of the requirements of the afore-mentioned safety agency approval and listing by Underwriters Laboratories®, Inc.). This tear-drop shape creates, upon installation of the cable-access door in a correspondingly-shaped notch in the lid's edge, a balance of pressure within the cable-access door's foam rubber seal that, despite the presence of an open area on one side of the door, provides a self-locating action which ensures that the cable-access door stays in place and does not try to slip out of it's intended position towards the open area.

When the lid is fitted onto the in-floor receptacle box (thereby forming a covered in-floor electrical conduit box), it is preferred that the box be able to bear a weight of at least 10,000 pounds (approximately the weight of a fully-loaded forklift, of the kind often used at the previously-noted venues) without becoming damaged or bent. Once the lid is removably attached to the in-floor electrical conduit box, it must also be able to pass the UL test for scrub-water tightness, which ensures that no water may enter the box when the lid is in its closed-and-latched configuration (i.e., all cable-access doors are in place). In order to be water tight, it is preferred that the user-configurable in-floor conduit box utilize neoprene-foam seals of exacting sizes and configurations that interact with areas of the lid and conduit box shaped specifically to receive these seals.

In one embodiment of the present invention, the in-floor electrical conduit box lid is designed to meet H20 load ratings, using a ⅞ inch thick alloy-6061-T6 heat-treated aluminum lid with an integrated floor-covering-edge protective flange. Additional structure that improves the load-bearing capabilities of the lid include a conduit-box-attached floor-covering-edge protective rim or flange constructed of ⅛ inch thick stainless steel alloy, designed and fitted to cantilever horizontally out away from the box so as to be supported by the conduit box's surrounding concrete floor structure. This allows transfer of the load of the weight on the lid to be distributed down into the structure of the building itself, which, by necessity, would be designed to easily support any such weights that are allowed, by code, into the building.

BRIEF DESCRIPTION OF THE DRAWINGS

The attached drawings are intended to better illustrate a preferred embodiment of the present invention without limiting the invention in any manner whatsoever.

FIG. 3C is an elevated front view of a third possible gang arrangement.

FIG. 3D is an elevated front view of a fourth possible gang arrangement.

FIG. 4 is a side cross sectional view of the in-floor electrical box with lid.

FIG. 8A is an elevational sectional view of the door of the present invention along line B-B of FIG. 6.

FIG. 8B is an elevational sectional view of the door of the present invention along line A-A of FIG. 6.

DETAILED DESCRIPTION OF THE PREFERRED EMBODIMENTS

The following description of preferred embodiments is presented to describe the present invention and is not to be construed to limit the scope of the appended claims in any manner whatsoever.

Figure 1:
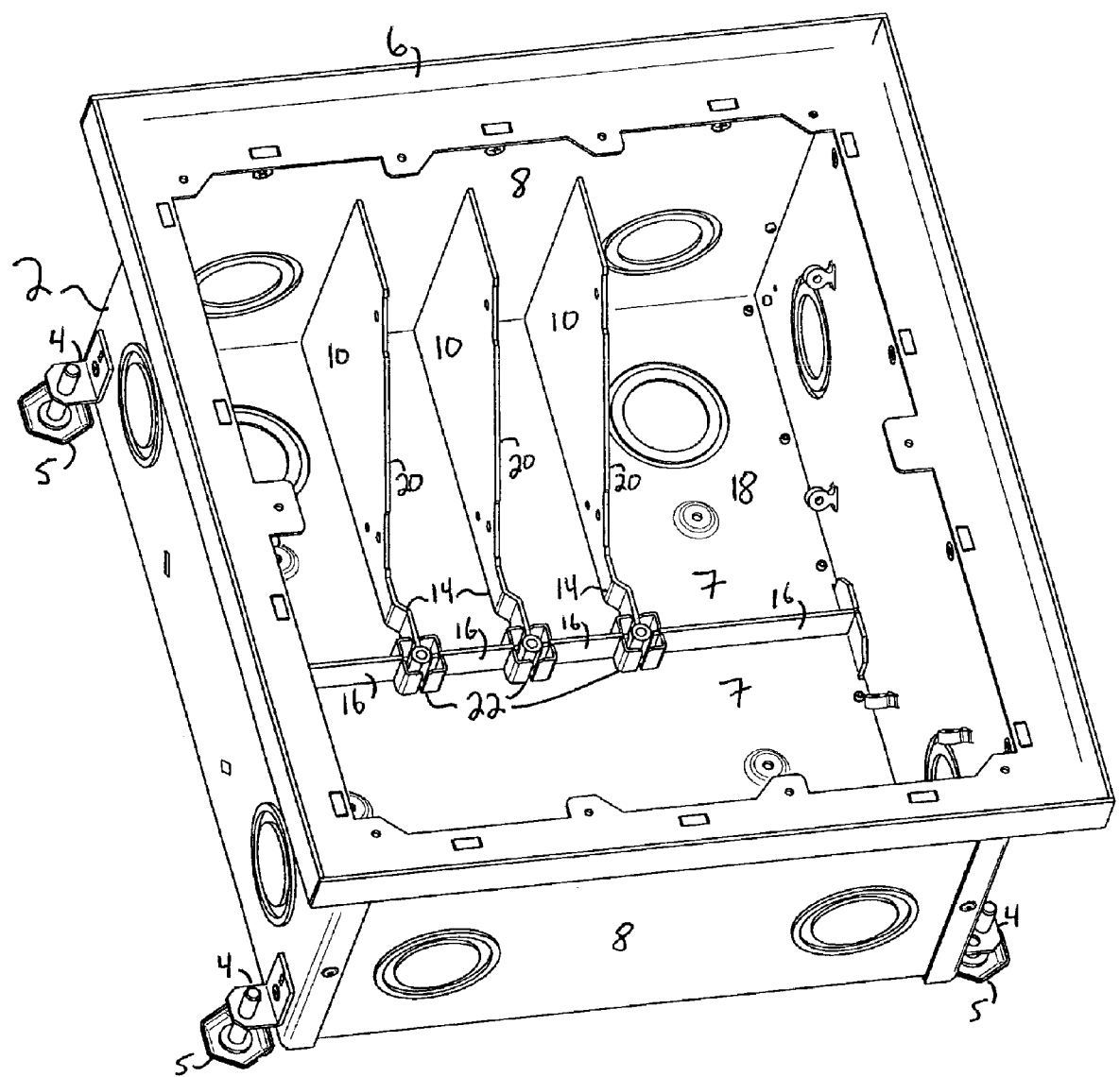
FIG. 1 is a top perspective view of the in-floor electrical box with three compartment dividers installed on one side of the box, forming four compartments on one side.

As best shown in FIG. 1, the user configurable in-floor receptacle or electrical conduit box (2) preferably has a plurality of supporting legs (4) that can be fixed or adjustable, to assist fitting the box to the required height of the in-floor opening. In a preferred embodiment, each leg (4) is provided with a screw-adjustable foot (5) which can be turned to raise or lower the in-floor electrical conduit box (2) relative to the surface of the floor in which the box is to be installed. Less preferred, although encompassed by the present invention, is an in-floor electrical conduit box (2) with fixed feet, with other types of adjustable feet, or without any feet at all.

The in-floor electrical conduit box (2) preferably includes a lip (6) upon which a lid (36, FIG. 4) is placed, preferably by removable attachment of one or more cable-access doors (46, FIG. 5A), described in detail below.

For the sake of simplifying the drawings, FIG. 1 depicts only one opposing gang-unit holder compartment (7) of the in-floor electrical conduit box (2) as being utilized for association with gang units; however, it is preferred that two opposing gang-unit holder compartments (7) be utilized, with each compartment being located along a side wall (8). Each of the two opposing gang-unit holder compartments (7) can contain up to three or more compartment dividers (10), each compartment divider having a divider face (20) on its upper end. The compartment dividers (10) include integral lengths (14) which slip inside one slot of the four-slot center-divider stabilizer traps (22). The two opposing gang-unit holder compartments (7) of the in-floor electrical conduit box (2) may optionally be divided from each other by center dividers (16), which may be removed in order to run cables across the compartments. Both the integral lengths (14) and the center dividers (16) may run across the box floor (18) or may be at least partially elevated at a height above the box floor.

Figure 2A:
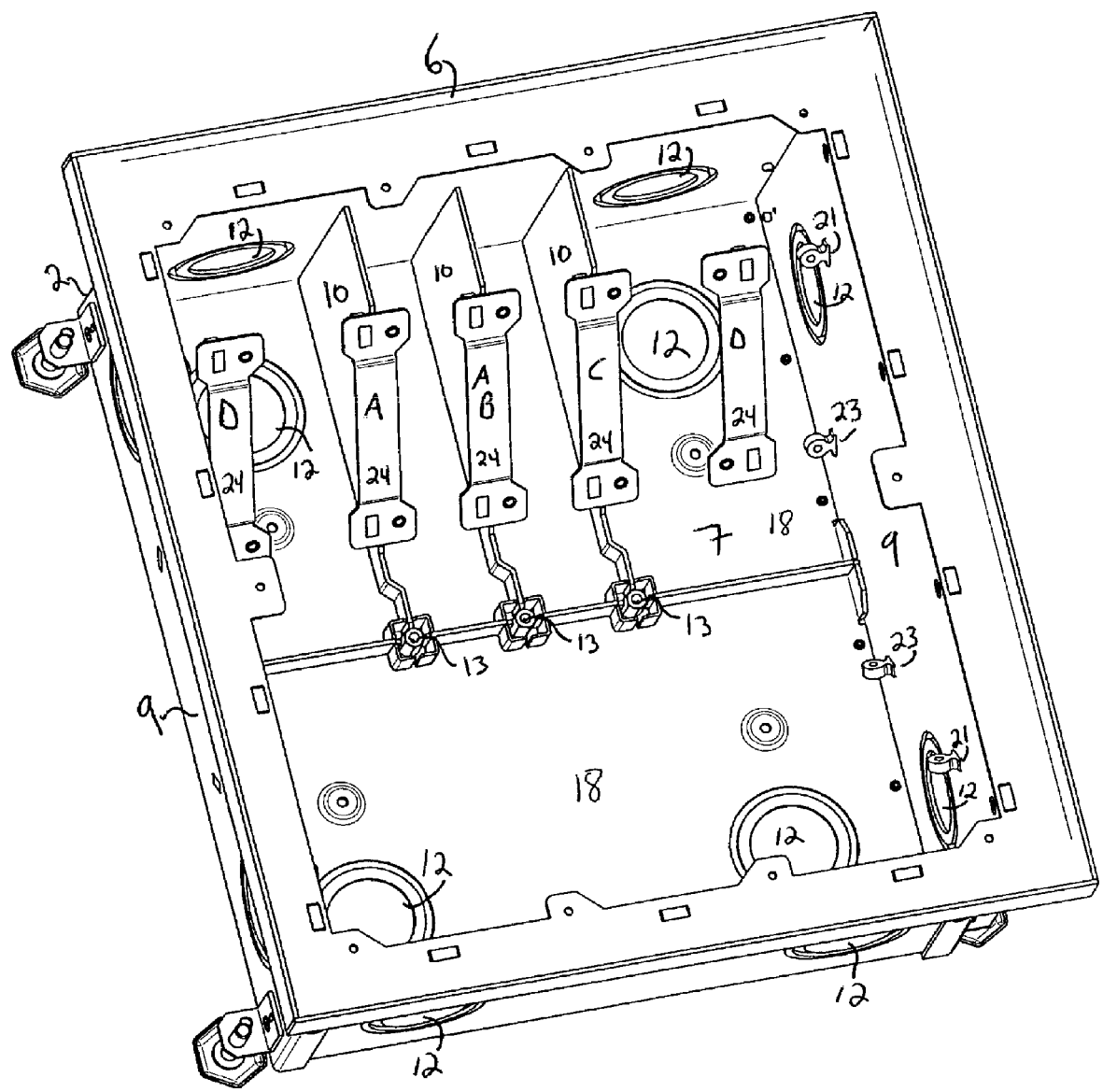
FIG. 2A is a top perspective view of the in-floor electrical box with five gang plate dividers installed.
Figure 2B:
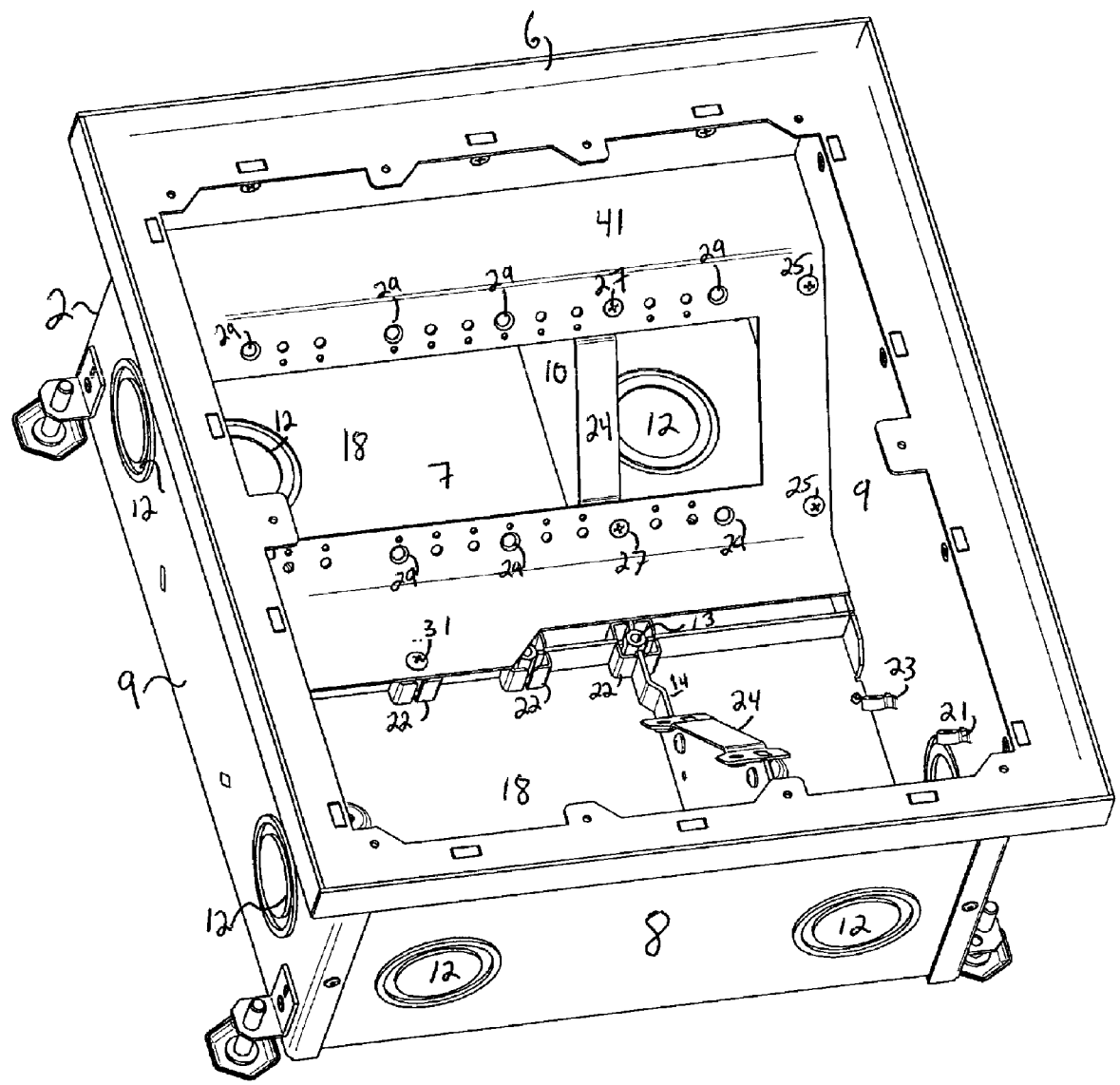
FIG. 2B is a top perspective view of the in-floor electrical box with a gang unit holder installed.

As best shown in FIGS. 2A and 2B, the compartment dividers (10) are fitted with gang-plate dividers (24) mounted on the divider faces (20). A gang-unit holder (41) is preferably attached to the in-floor electrical conduit box (2) via pressed-in right-angle screw bosses (21, 23) located on the perpendicular walls (9) at either end of the gang-holder compartments (7). The gang unit holder (41) is also preferably supported near the center of the box via a screw (31) through it into one or more of the off-of-box-center threaded standoffs (13) that attach the center-divider stabilizers (22) to the in-floor electrical conduit box (2).

The in-floor conduit box (2) may be constructed of any suitable material known in the art; however, it is preferred that it be constructed of 14 gauge carbon steel, which is galvanized all over.

Preferably, both the box floor (18) and each side wall (8) and perpendicular wall (9) of the in-floor electrical conduit box (2) contain a plurality of 'knockouts' (12). These 'knockouts' (12) are round, removable hole covers, optionally fabricated from the box (2) material itself, that provide for the installation of various-size fittings designed specifically for the attachment of piping for wiring, or "conduit", as it is known in the trade. This conduit is used to fully contain, protect, and guide permanent cables, wires and/or cords (42, FIG. 4) that run from a venue's electronic equipment or power source into the in-floor conduit box (2). Each knockout (12) is preferably comprised of two concentric rings surrounding a solid disk: a permanent cable, wire or cord (42) with a diameter of up to 1.00 inch can pass through into the in-floor conduit box (2) when the solid disk is removed; a permanent cable, wire or cord (42) with a diameter of up to 1.25 inch can pass through into the in-floor conduit box (2) when both the smaller-sized ring and the solid disk are removed; and a permanent cable, wire or cord (42) with a diameter of up to 1.50 inch can pass through into the in-floor conduit box (2) when the solid disk and both rings are removed. It is preferred that there are two knockouts (12) per side (8, 9) of the in-floor conduit box (2), including the box floor (18). However, it is envisioned that any number of knockouts (12) can be placed on the walls (8, 9) or floor (18) of the in-floor conduit box (2) as well as on the lid (36).

Once the permanent wires, cables or cords (42) from the venue's electronic equipment or power source are passed through the knockouts (12), they can be stored in the in-floor conduit box (2) until they are connected to the reverse side of the receptacles (34), described in more detail below.

The gang-unit holders (41) define, by the spacing of the receptacle-mounting taps and holes they contain, the gang units (26) that may be used or occupied by any venue-owner-installed receptacles (34). "Receptacles" (34) are specific hardware known to those of skill in the art, and are associated with different cable, cord or wire types. In general, the type of permanent cable, cord or wire (42) coming into the box (2) defines the type of receptacle (34) used. For example, if it is desired that a user/visitor be allowed connection to a mains-type power supply in the in-floor conduit box, the permanent cable, cord or wire (42) passing into the box (2) will be an electrical-code-appropriate live electric wire carrying mains-type current and voltage, and it will attach to a mains-power-capable two- or three-prong outlet as the user/visitor-accessible receptacle (34) in the gang unit (26). On the other hand, because high-definition audio and/or video may also be desired and utilized, the permanent cable, cord or wire (42) passing into the box (2) may be an HDMI-in cable that, installed in another gang-unit (26) space, is attached to a different type of receptacle (34) having an appropriate connector that is designed to receive a temporary cable, cord or wire (40) carrying an HDMI signal.

Each gang unit (26) can have one or more individual-wire receptacles (34). Examples of receptacles (34) that can be used with the present invention include, but are not limited to, coaxial cable connections (also known as "F-connectors"), electrical power outlets (also known as "duplex" outlets), RCA jacks, telephone jacks, positive and negative speaker connectors, optical connections, audio jacks, video jacks, USB ports, Ethernet ports, etc.

Temporary and permanent cables, cords or wires (40, 42) that can be used with the present invention include, but are not limited to, coaxial cables, current-carrying mains-type cables, category 3 wires, alarm or security wires, speaker wires, optical wires, composite video cables, component video cables, s-video cables, VGA cords, DVI cords, HDMI cords, UDI cords, line cords, DisplayPort cords, infrared wires, telephone wires, computer cables and any other electronic, electric or power cables, cords or wires that may be desired.

A specific 'gang arrangement' (as noted in FIGS. 3A through 3D) is created by adding or removing various compartment dividers (10) and/or corresponding gang plate dividers (24) to the in-floor conduit box (2) within the gang-unit holder (41) compartment (7). The gang-unit holder (41) may be designed to allow for the attachment of gang unit (26) receptacles (34) by any removable connection; however, it is preferred that receptacles (34) be attached to the gang-unit holder (41) by one or more screws.

As best shown in FIG. 2B, the gang-unit holder (41) is attached to the in-floor electrical conduit box (2) via screws (25) which go through the holes at either end of the gang-unit holder (41) and into the pressed-in right-angle screw bosses (21, 23) on the walls (8) of the receptacle box (2). The gang-unit holder (41) is also attached to one of the center-divider stabilizers (22) via a screw (31). The gang-plate divider (24) located on the compartment divider (10) is also preferably attached to the gang-unit holder (41) by screws (27). In some circumstances, such as when no compartment dividers (10) are to be used, the gang-plate dividers (24) may be connected to the gang-unit holder (41) via screws (27) at specific screw holes (29).

Once assembled, the receptacles (34) installed in their intended locations in the gang-unit holders (41) are offset to the left or right of the box centerline by about 0.187 inches. This ensures that, in all gang-unit configurations, the temporary cables, cords or wires (40) that go to the receptacles (34) in both gang-unit holders extend straight out from the receptacles (34) (parallel to the box centerline) and pass by each other with little or no interference.

Figure 3A:
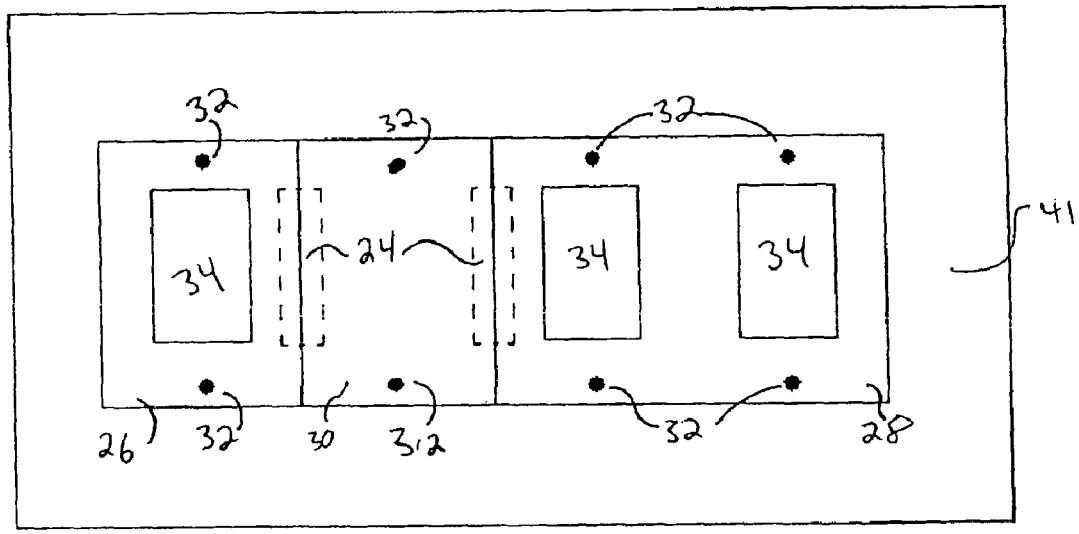
FIG. 3A is an elevated front view of a first possible gang arrangement.

FIG. 3A shows an internal gang-unit holder layout of standard-size wall plates corresponding to gang arrangement "A" of FIG. 2A, which is considered to be 1GX2G (i.e., from left to right, there is a single-gang unit (26) followed by a double-gang unit (28) with a space in between). This space between the first gang unit (26) and the second gang unit (28) is covered by a gang-unit-hole covering spacer (30). The gang-unit-hole covering spacers (30) and receptacles (34) are mounted on the gang-unit holder (41), preferably with screws (32). Underneath the gang-unit holder (41) are the gang-plate dividers (24) (labeled with "A" in FIG. 2A) which attach and locate the compartment dividers (10). No other gang-plate dividers (24) are present in the A-type gang arrangement.

As will be recognized by one skilled in the art, gang arrangement "A" can be reversed to be 2GX1G (i.e., from left to right, there is a double-gang unit followed by a single-gang unit) without materially deviating from the above description.

Figure 3B:
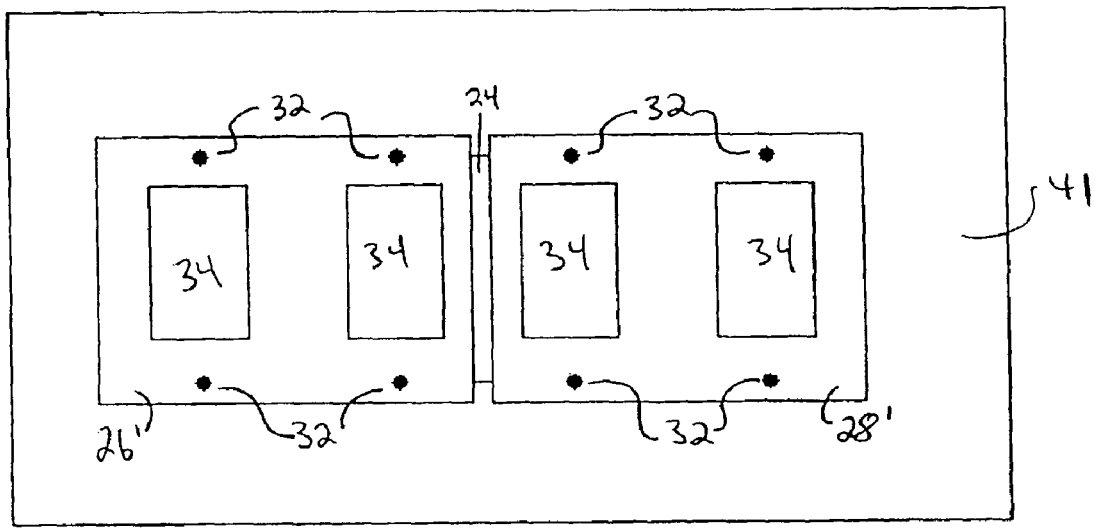
FIG. 3B is an elevated front view of a second possible gang arrangement.

FIG. 3B shows a second internal gang-unit holder layout of standard-size wall plates corresponding to gang arrangement "B" of FIG. 2A, which is configured to be 2GX2G (i.e., from left to right, there is a double-gang unit (26') followed by a second double-gang unit (28')). The first gang unit (26') is separated from the second gang unit (28') by a single compartment divider (10) and associated gang-plate divider (24) (labeled "B" in FIG. 2A). No other gang plate dividers (24) need be present in the "B" type gang arrangement. As in the arrangement of FIG. 3A, described above, the desired receptacles (34), are mounted on the gang-unit holder (41), preferably with screws (32) in the taps provided, and the gang-plate divider (24) is attached to the underside of the gang-unit holder (41).

FIG. 3C shows a third internal gang-unit holder layout of standard-size wall plates corresponding to gang arrangement "C" of FIG. 2A, which is considered to be 3GX1G (i.e., from left to right, there is a triple-gang unit (26") followed by a single-gang unit (28")). The first gang unit (26") is separated from the second gang unit (28") by the gang-plate divider (24) (labeled "C" in FIG. 2A) and associated compartment divider (10). No other gang-plate dividers (24) need be present in the "C"-type gang arrangement. As in the arrangement of FIG. 3B, described above, the desired receptacles (34) are mounted on the gang-unit holder (41), preferably with screws (32) in the taps provided, and the gang-plate divider (24) is attached to the underside of the gang-unit holder (41). As with gang arrangement "A", gang arrangement "C" can be reversed to be configured as 1GX3G (i.e., from left to right, there is a single-gang unit followed by a triple-gang unit) if desired by the user.

FIG. 3D shows a fourth internal gang-unit holder layout, with standard-size 4 G wall plate, corresponding to gang arrangement "D", which is considered to be 4 G (i.e., there is a one quadruple-gang unit). The space containing all of the gang units (26''') in this arrangement is the uninterrupted area enclosed by the gang-unit holder (41). Beneath the gang-unit holder (41) are gang-unit dividers (24) (labeled "D" in FIG. 2A), which serve to close off the ends of the gang-unit holder's (41) rectangular hole beyond the ends of the standard 4 G wall plate. In this arrangement, the desired receptacles (34) are mounted on the gang-unit holder (41), preferably with screws (32) in the taps provided, and the gang-plate dividers (24) are attached to the underside of the gang-unit holder (41) without the use of compartment dividers (10).

As briefly described above, the gang units (26, 28) comprise one or more receptacles (34) to which the permanent cable, cord or wire (42) that enters the in-floor receptacle box (2) via the knockout (12) is connected. The permanent cable, cord or wire (42) is preferably removably attached to the receptacle (34) so that the receptacle in the conduit box (2) may be changed if it fails. Preferably, the permanent cable, cord or wire (42) enters the conduit box (2) through a knockout (12) on the side of the box (2) where the corresponding receptacle (34) is to be placed on a gang unit (26). Of course, if there is a reason for a wire to pass from one side of the box (2) to the other, a portion of the center dividers (16) can be removed, as discussed above. It is also preferred that the permanent cables, cords or wires (42) run parallel to the length of the compartment dividers (10), if present, rather than through the compartment dividers (10). Also, as previously discussed, the compartment divider (10) may have an integral length (14) interlocked to a stabilizer trap (22).

Of course, each of the gang units (26, 28) can include one or more receptacles (34) for removably receiving a corresponding connection element on a temporary cable, wire or cord (40). Temporary cables, wires or cords (40) can then be connected to the in-floor receptacle box via the receptacles (34) within the various gang units (26, 28). Therefore, when in use, it is preferred that the in-floor receptacle box (2) have a lid (36) that provides access for the temporary wires (40) into the in-floor receptacle box (2) for connection to the receptacles (34) therein.

Figure 5A:
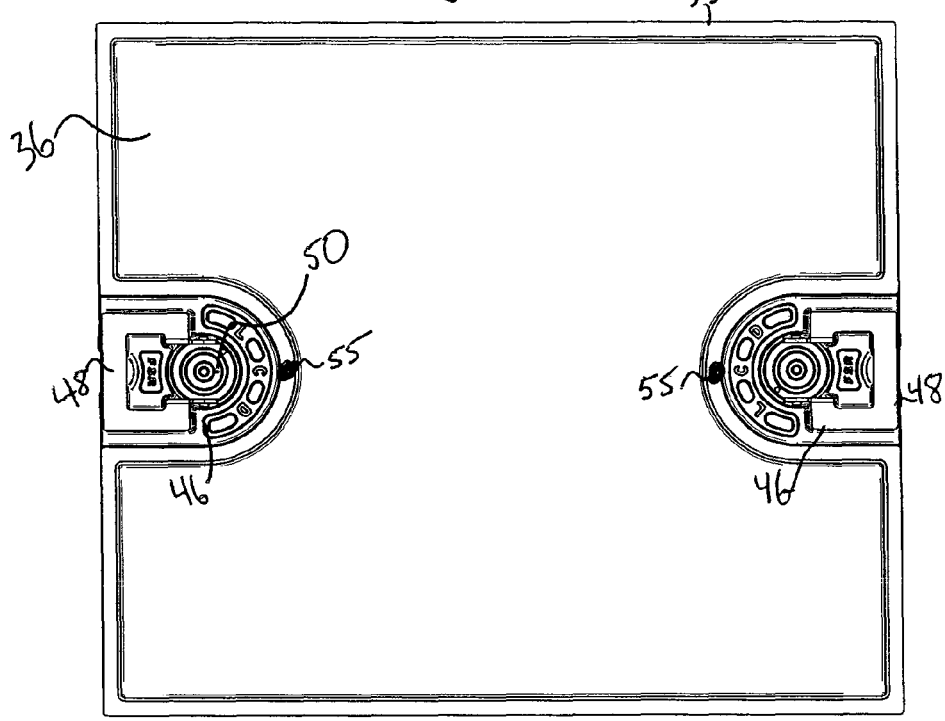
FIG. 5A is a top view of the lid of the present invention with the doors thereof in a closed configuration.
Figure 5B:
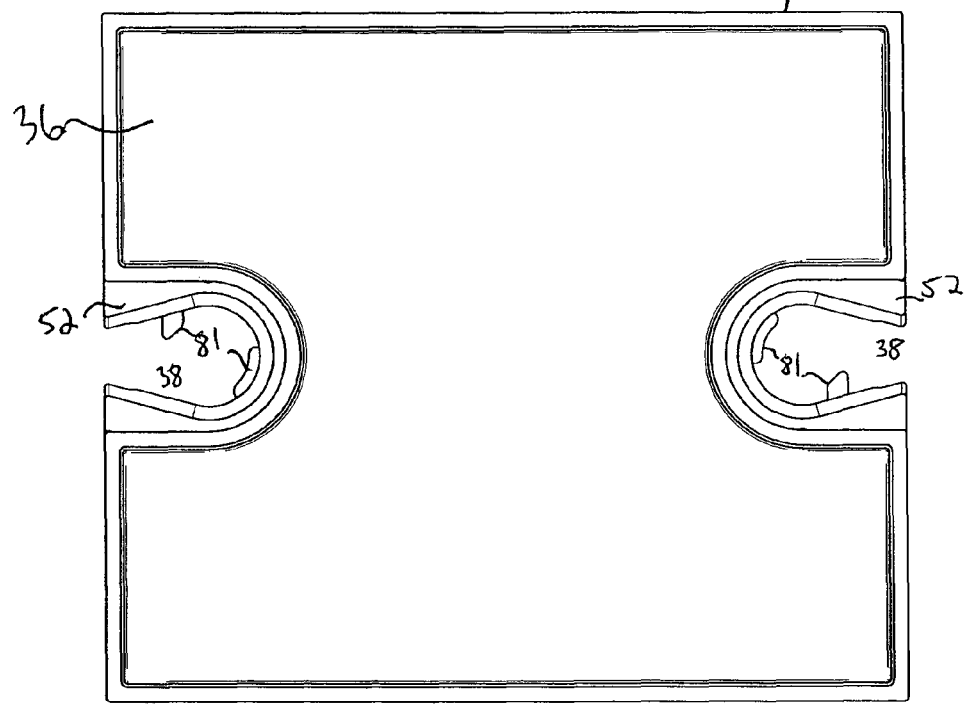
FIG. 5B is a top view of the lid of the present invention with the doors thereof in an open configuration.

As best shown in FIGS. 4, 5A and 5B, the preferred in-floor receptacle or electrical conduit box (2) has a lid (36) with at least one door (46) that can be removed to create a door hole (38) for allowing one or more temporary cables, cords or wires (40) to access the in-floor electrical conduit box (2). When the door (46) is removed, it is preferably safely and securely stored by attaching it to the bottom of the lid (36) in any manner that does not interfere with either the temporary or permanent cables, cords and/or wires (40, 42), including connections and receptacles (34) attached thereto, which are installed therein.

In its preferred embodiment, a layer of carpet or other flooring material (not shown) can be placed on or, preferably, attached to the top surface of the lid (36) so that the in-floor receptacle box (2) may blend in with the surrounding flooring material. For example, FIG. 4 shows the top surface of the lid (36) provided with carpet flanges (33) that will ensure that a piece of carpet or other flooring material will have it's edge protected, and resistant to damage or lifting, while it's attached to the lid. Notwithstanding, any manner known to those in the art may be used to attach the carpet or other flooring material to the top surface of the lid (36) including, but not limited to, adhesives, VELCRO®, clips, snaps, channels, toggles and buttons.

As best shown in FIG. 5A, the lid (36) of the present invention is preferably relieved of material to create the carpet flange (33). There is at least one door (46), and preferably two or more doors (46), located on the lid (36). The doors (46) can be placed anywhere on the surface of the lid (36), however, it is preferred that a portion of each door (46) be placed adjacent to the lid edge.

The lid (36) may be constructed of any material known in the art, however, it is preferred that it be constructed of a ⅞ inch thick aluminum plate, which is alloy 6061-T6, so that it can withstand significant loads when placed on the receptacle box (2). Additional support structure (not shown) can be added to the lid (36) if additional loads are envisioned.

Figure 6:
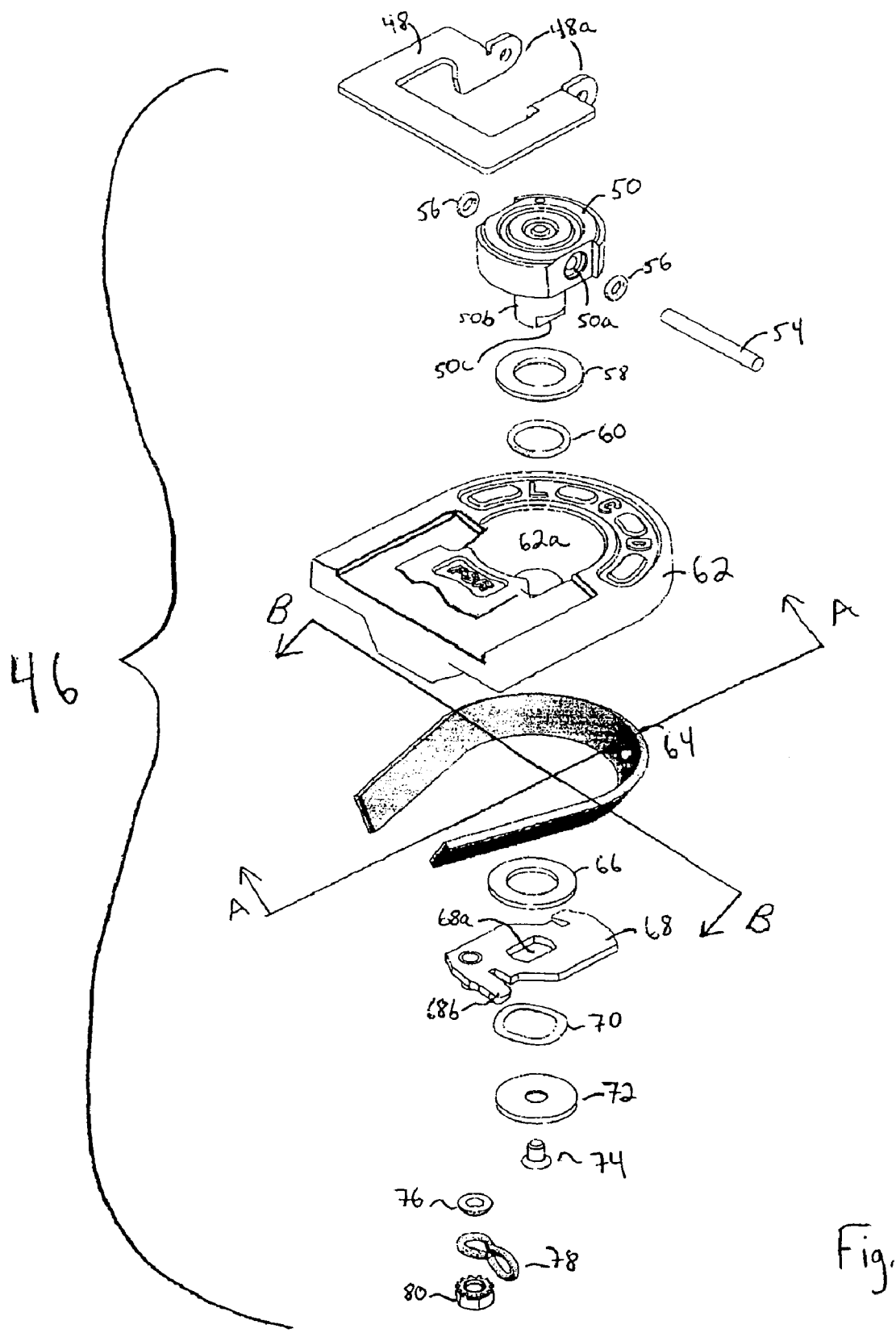
FIG. 6 is an exploded view of the door of the lid of the present invention.
Figure 7:
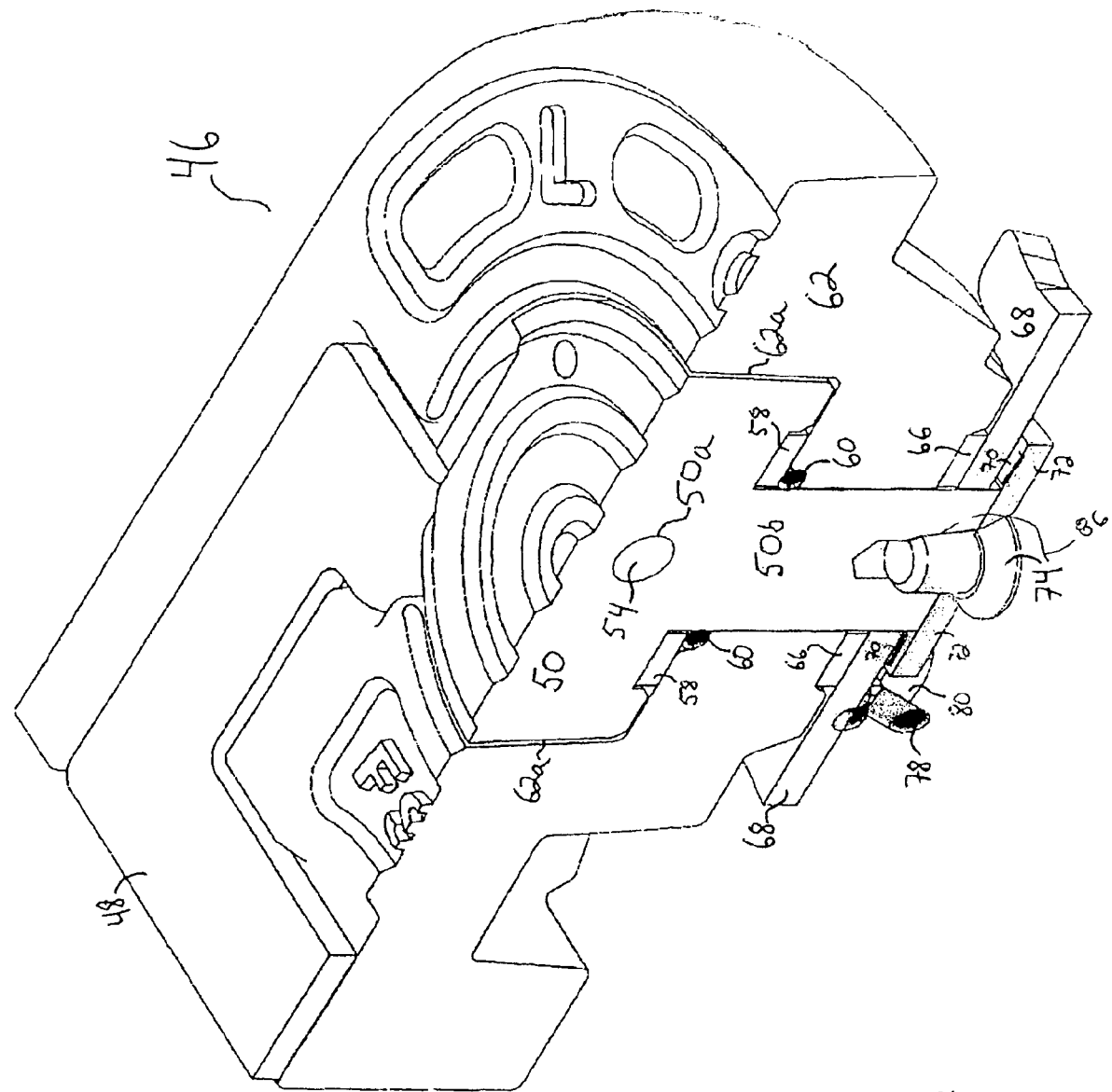
FIG. 7 is a perspective cutaway view of the door of the present invention.

When in place on the lid (36), the doors (46) preferably rest on a door lip (52) that is slightly below the level of the surface of the lid (36). It should be noted in FIG. 5B that the shape of the opening (38) in the lid (36) is a "tear-drop" shape that narrows as it nears the edge of the lid (36). This shape creates a balance of pressures within the door's foam rubber seal (64, see FIG. 6) that ensures the door (46) self-aligns within the lid opening (38) and won't try to slip out of position towards said opening's entry area. To facilitate use of the doors (46), the preferred door (46) has a bail handle (48) that acts as both door-latch lever and handle, and it lays flat against the door (46) when not in use. In order to remove the door (46), the bail handle (48) is raised at an edge not connected to the latch pivot (50). The user may then place a finger or appropriately shaped tool (e.g., screwdriver) through the bail handle's (48) open center, and turn the bail handle (48) about a latch pivot (50). This unlatches the door (46), allowing it to be removed by lifting it off of the lid (36). As best shown in FIG. 5B, once one or both of the doors (46) have been removed, the interior of the covered in-floor electrical conduit box (2) of the present invention may be accessed.

Preferably, and as discussed above, the removed door (46) is stored by removably attaching the door (46) to the underside of the lid (36) in a manner that does not interfere with any temporary or permanent wires, cords or cables (40, 42). This could comprise a receiver (not shown) fixed to the bottom of the lid, similar to the receiver (81) that accepts the latch cam (68) of the door (46) when mounted on the lid (36), or it could be magnets, clips, channels, etc.

As best shown in FIGS. 6, 7, 8A and 8B, the most preferred embodiment of the door (46) of the present invention has a bail handle (48) which attaches to the latch pivot (50) via inserting a rod (54) through the bail handle eyelets (48a), the latch pivot hole (50a) and, optionally, two rubber gaskets (56). The latch pivot stem (50b) of the latch pivot (50) is inserted through a washer (58) and O-ring seal (60) and a hole in the door casting (62), so that the combination of bail handle (48) and latch pivot (50) are situated in an indentation (62a) in the door casting (62). A curved door pad (64) is fitted to the bottom of the door casting (62). Another washer (66) is then placed on the latch pivot stem (50b), followed by a latch cam (68), a wave spring (70), and an end-cap (72). A screw (74) is then inserted through the washer (66), latch cam (68), wave spring (70), and end-cap (72) into a hole (86) located in the bottom of the latch pivot stem (50b) in order to assemble the door (46) as one piece. A washer (76), retention chain (78) and hex nut (80) are attached to the latch cam (68) in order to secure the door (46) to the lid (36) in a way that allows the door (46) to be moved in all directions, but not lost away from the lid (36).

Because a portion of the latch pivot stem (50b) has a flat face (50c) that fits into the latch cam opening (68a), the latch cam (68) is forced to turn when the bail handle (48) is turned. If the latch cam lock (68b) was previously in a latched position (i.e., inside a receiver (81) situated within the lid (36)), turning the bail handle (48) unlatches the door (46) so that the door (46) may be removed from the lid (36).

In one embodiment of the present invention, the door (46) may be provided with a lock (55) of any design known to those of skill in the art, so that only an authorized user may remove the door (46), thereby gaining access to the interior of the covered in-floor electrical conduit box (2).

The door (46) may be constructed of any material known in the art, however, it is preferred that it is zinc/aluminum alloy of ZA-73 casting. Further, the bail handle (48) may be constructed of any material known in the art, however, it is preferred that it is stainless steel alloy T304.

Of course, variations, modifications, or deviations to the above description may be or become known to persons skilled in the art in light of this description. All such variations, modifications, deviations and the like are intended to be part of the present invention, limited only by the following claims.

The invention claimed is:

1. A user-configurable in-floor electrical conduit box comprising:
   a. a gang-unit holder removably fixed within said box;
   b. at least one receptacle in at least one gang-unit of space removably attached to said gang-unit holder;
   c. at least one removably mounted gang compartment divider; and
   d. at least one center divider plate perpendicular to said gang compartment dividers and interlocked with either two stabilizer traps or one stabilizer trap and an interlocking slot on a wall of the conduit box wall;
   wherein said in-floor electrical conduit box enables the connection of permanent cables, wires or cords to temporary cables, wires or cords through at least one of the receptacles located in said gang unit.

2. The user-configurable in-floor electrical conduit box of claim 1 comprising a plurality of specifically-sized gang-unit spaces, which are user-adaptable via the gang unit holder to at least one configuration selected from the group consisting of 1G, 1GX1G, 1GX2G, 1GX3G, 1GX4G, 1GX5G, 2G, 2GX1G, 2GX2G, 2GX3G, 2GX4G, 3G, 3GX1G, 3GX2G, 3GX3G, 4G, 4GX1G, 4GX2G, 5G, 5GX1G and 6G.

3. The user-configurable in-floor electrical conduit box of claim 2 wherein said configuration uses from about 4⅔ to about 4¾ gang-unit spaces.

4. The user-configurable in-floor electrical conduit box of claim 1 further comprising a lid.

5. The user-configurable in-floor electrical conduit box of claim 4 wherein said lid further comprises an integrated flange attached to the top of said lid for securing flooring materials to the top of said lid.

6. The user-configurable in-floor electrical conduit box of claim 4 wherein said lid further comprises at least one door located on said lid and wherein the removal of said door provides a door hole through which temporary cables, cords and wires may enter the in-floor electrical conduit box.

7. The user-configurable in-floor electrical conduit box of claim 6 wherein said door removably secures said lid to said in-floor electrical conduit box.

8. The user-configurable in-floor electrical conduit box of claim 6 wherein said door is provided with a latch for securing said door to said lid.

9. The user-configurable in-floor electrical conduit box of claim 8 wherein said latch further comprises:
   a. a bail handle attached to a latch pivot;
   b. said latch pivot further comprising a stem that engages a latch cam;
   c. and a wave spring inserted between a stem end-cap and said latch cam.

10. The user-configurable in-floor electrical conduit box of claim 7 wherein said lid further comprises a top surface upon which a flooring material may be applied.

11. The user-configurable in-floor electrical conduit box of claim 6 wherein said door comprises a waterproof barrier selected from the group consisting of gaskets, washers, O-rings wave springs, end-caps and combinations thereof.

12. The user-configurable in-floor electrical conduit box of claim 4 further comprising a waterproof barrier between said box and said lid.

13. The user-configurable in-floor electrical conduit box of claim 12 wherein said waterproof barrier is a seal.

14. The user-configurable in-floor electrical conduit box of claim 13 wherein said seal is neoprene-foam.

15. The user-configurable in-floor electrical conduit box of claim 1 wherein said gang-unit holder comprises an open area for holding receptacles, wherein said receptacles are attached to said gang-unit holder by an attachment means wherein said attachment means are located about ⅓-gang-space (about 0.604 inches) apart, along a single centerline.

16. The user-configurable in-floor electrical conduit box of claim 1 wherein said receptacles are selected from the group consisting of coaxial cable connections, F-connectors, electrical and/or power outlets, duplex outlets, RCA jacks, telephone jacks, positive and negative speaker connectors, optical connections, audio jacks, video jacks, USB ports, Ethernet ports, audio/video jacks and combinations thereof.

17. The user-configurable in-floor electrical conduit box of claim 1 further comprising at least one knockout located on a side or floor of said box.

18. The user-configurable in-floor electrical conduit box of claim 1 further comprising a plurality of legs wherein each of said plurality of legs can be adjusted to vary the height of said in-floor electrical conduit box.

19. A user-configurable in-floor electrical conduit box comprising:
   a. a gang-unit holder removably fixed within said box;
   b. at least one receptacle in at least one gang-unit of space removably attached to said gang-unit holder;
   c. a lid comprising at least one door located on said lid, said door comprising a door casting, wherein a curved door pad is fitted to the bottom of said door casting and wherein the removal of said door provides a door hole through which temporary cables, cords and wires may enter the in-floor electrical conduit box;
   wherein said in-floor electrical conduit box enables the connection of permanent cables, wires or cords to temporary cables, wires or cords through at least one of the receptacles located in said gang unit.

20. The user-configurable in-floor electrical conduit box of claim 19 wherein said curved door pad provides a waterproof barrier.

21. The user-configurable in-floor electrical conduit box of claim 19 wherein said lid further comprises an integrated flange attached to the top of said lid for securing flooring materials to the top of said lid.

22. The user-configurable in-floor electrical conduit box of claim 19 wherein said door removably secures said lid to said in-floor electrical conduit box.

23. The user-configurable in-floor electrical conduit box of claim 19 wherein said door is provided with a latch for securing said door to said lid.

24. The user-configurable in-floor electrical conduit box of claim 23 wherein said latch further comprises:
   a. a bail handle attached to a latch pivot;
   b. said latch pivot further comprising a stem that engages a latch cam;
   c. and a wave spring inserted between a stem end-cap and said latch cam.

* * * * *